(12) United States Patent
Ginani

(10) Patent No.: US 12,033,529 B2
(45) Date of Patent: Jul. 9, 2024

(54) AIRWAY SIMULATOR

(71) Applicant: Covidien LP, Mansfield, MA (US)

(72) Inventor: Milan Ginani, San Diego, CA (US)

(73) Assignee: Covidien LP, Mansfield, MA (US)

( * ) Notice: Subject to any disclaimer, the term of this patent is extended or adjusted under 35 U.S.C. 154(b) by 665 days.

(21) Appl. No.: 17/031,578

(22) Filed: Sep. 24, 2020

(65) Prior Publication Data

US 2021/0097891 A1 Apr. 1, 2021

Related U.S. Application Data

(60) Provisional application No. 62/906,904, filed on Sep. 27, 2019.

(51) Int. Cl.
*G09B 23/28* (2006.01)
(52) U.S. Cl.
CPC .................................. *G09B 23/288* (2013.01)
(58) Field of Classification Search
CPC .................................................... G09B 23/288
USPC ......................................................... 434/265
See application file for complete search history.

(56) References Cited

U.S. PATENT DOCUMENTS

| | | | |
|---|---|---|---|
| 6,684,882 B1* | 2/2004 | Morine | A61M 16/107 |
| | | | 128/207.18 |
| 2007/0122784 A1* | 5/2007 | Carvajal | G09B 23/288 |
| | | | 434/267 |
| 2008/0200966 A1* | 8/2008 | Blomberg | A61M 16/024 |
| | | | 607/42 |
| 2009/0099657 A1* | 4/2009 | Hopper | A61B 17/24 |
| | | | 623/10 |
| 2014/0332005 A1* | 11/2014 | Kunz | A61M 16/0666 |
| | | | 128/205.25 |
| 2018/0218647 A1* | 8/2018 | Rodriguez | G09B 23/303 |
| 2019/0232000 A1* | 8/2019 | Allum | A61M 16/085 |
| 2020/0303080 A1* | 9/2020 | Dubois | G06F 30/28 |

(Continued)

FOREIGN PATENT DOCUMENTS

CN 210830646 U * 6/2020

OTHER PUBLICATIONS

7200 Series Ventilator, Options, and Accessories: Operator's Manual. Nellcor Puritan Bennett, Part No. 22300 A, Sep. 1990, pp. 1-196.

(Continued)

*Primary Examiner* — Robert P Bullington
*Assistant Examiner* — Stephen Alvesteffer

(57) ABSTRACT

An adjustable airway simulator that allows for different sizes of nasal cannulas to be connected. The simulator may include a fixture body that has a first tube and a second tube at a first end of the body. The second end of the body includes connector to connect a lung simulator. The simulator also includes a first nasal adapter and a second nasal adapter. Each nasal adapter comprising an open cylinder to be rotatably mounted to the first tube or the second tube. Each nasal adapter also includes a port to connect to a prong of a nasal cannula. When one or both of the nasal adapters are rotated, a septal distance between the ports of the first and second nasal adapters changes, which allows for connection to different sized cannulas. Differently sized nasal adapters may also be included to further augment the simulators adaptability to different nasal cannulas.

20 Claims, 4 Drawing Sheets

(56) References Cited

U.S. PATENT DOCUMENTS

2021/0241657 A1* 8/2021 Brunner ................ G09B 23/30

OTHER PUBLICATIONS

7200 Ventilatory System: Addendum/Errata. Nellcor Puritan Bennett, Part No. 4-023576-00, Rev. A, Apr. 1998, pp. 1-32.
800 Operator's and Technical Reference Manual. Series Ventilator System, Nellcor Puritan Bennett, Part No. 4-070088-00, Rev. L, Aug. 2010, pp. 1-476.
840 Operator's and Technical Reference Manual. Ventilator System, Nellcor Puritan Bennett, Part No. 4-075609-00, Rev. G, Oct. 2006, pp. 1-424.
Puritan Bennett 980 Series Ventilator Operator's Manual, Covidien, Jan. 29, 2014, Part. No. 10077893 A Jan. 2014, 506 pages.

* cited by examiner

AIRWAY SIMULATOR

RELATED APPLICATION

This application claims the benefit of U.S. Provisional Application No. 62/906,904, filed Sep. 27, 2019, and titled "Airway Simulator." The entirety of that application is incorporated herein by reference.

BACKGROUND

The present disclosure relates generally to medical devices and, more particularly, to an airway simulator, for testing and training non-invasive patient interfaces with a mechanical ventilator.

Mechanical ventilators provide breathing gases to patients in hospitals, nursing facilities, surgery centers, and other clinical facilities. These ventilators connect to a patient through a breathing hose (often called a circuit) that has an inspiratory limb and expiratory limb. Inhalation gases flow from the ventilator to the patient, and exhalation gases from the patient back to the ventilator. At the patient, the breathing circuit connects to a patient interface such as a mask, nasal cannula, endotracheal tube, or tracheostomy tube.

It can be beneficial to attach a breathing circuit to a test fixture, rather than to a patient, for testing or training purposes. The test fixture simulates a patient airway.

SUMMARY

The present disclosure relates generally to medical devices and, more particularly, to an airway simulator, for testing and training non-invasive patient interfaces with a mechanical ventilator. In an aspect, the technology relates to an airway simulator for use with a mechanical ventilator. The airway simulator includes a fixture body comprising a first tube and a second tube at a first end of the fixture body and a connector at a second end of the body. The airway simulator also includes a first nasal adapter and a second nasal adapter, and each nasal adapter includes an open cylinder and a port. The first nasal adapter is rotatably mounted on the first tube, and the second nasal adapter is rotatably mounted on the second tube. Rotation of the nasal adapters about the first and second tubes changes a septal distance between the ports of the first and second nasal adapters.

In an example, the airway similar further includes additional pairs of nasal adapters of different sizes. In another example, the fixture body further includes a measurement port. In yet another example, the fixture body further includes a leak port configured to simulate a leak condition. In still another example, the cylinder of the first nasal adapter has an internal cylinder diameter size; the cylinder of the second nasal adapter has the internal cylinder diameter size; the port of the first nasal adapter has an internal port diameter size, wherein the internal port diameter size is smaller than the internal cylinder diameter size; and the port of the second nasal adapter has the internal port diameter size. In a further example, the internal cylinder diameter size is approximately a size of an outer diameter of the first tube. In still yet another example, the first nasal adapter includes a conical segment between the port and cylinder. In another example, the fixture body is made from a first material and the first nasal adapter is made from a second material, wherein the second material is more flexible than the first material.

In another aspect, the technology relates to an airway simulator kit for use with a mechanical ventilator. The kit includes a fixture body. The fixture body includes at a first end of the body, a first tube and a second tube; and, at a second end of the body, a connector configured to be connected to a lung simulator. The kit also includes a set of nasal adapters configured to be attached to a nasal cannula and at least one of the first tube or the second tube. The set of nasal adapters include a first pair of nasal adapters, wherein each nasal adapter in the first pair of nasal adapters includes a cylinder having an internal diameter size and a port having a first internal port diameter size. The set of nasal adapters also include a second pair of nasal adapters, wherein each nasal adapter in the first pair of nasal adapters includes a cylinder having the internal diameter size and a port having a second internal port diameter size, wherein the second internal port diameter size is different from the first internal port diameter size.

In an example, each nasal adapter in the first pair of nasal adapters includes a first indicia indicative of the first internal port diameter size, and wherein each nasal adapter in the second pair of nasal adapters includes a second indicia indicative of the second internal port diameter size. In another example, each nasal adapter in the first pair of nasal adapters is configured to be rotatably mounted to at least one of the first tube or the second tube. In a further example, each nasal adapter in the first pair of nasal adapters is configured such that rotation of at least one of the nasal adapters in the first pair of nasal adapters changes a septal distance between the ports of the nasal adapters in the first pair of nasal adapters. In yet another example, each nasal adapter in the first pair of nasal adapters includes a conical segment between the cylinder and the port. In still another example, the first internal port diameter is smaller than the internal diameter size of the cylinder of the nasal adapters in the first pair of nasal adapters. In still yet another example, the first port diameter size is in the range of 3-6 mm. In another example, the fixture body further includes at least one of a measurement port or a leak port.

In another aspect, the technology relates to another airway simulator. The airway simulator includes a fixture body that includes at a first end of the body, a first tube and a second tube; and at a second end of the body, a connector configured to be connected to a lung simulator. The airway simulator also includes a first nasal adapter including a first cylinder and a first port, wherein the first cylinder is configured to be rotatably mounted on the first tube and wherein the first port is configured to be connected to a first prong of a nasal cannula. The airway simulator also includes a second nasal adapter including a second cylinder and a second port, wherein the second cylinder is configured to be rotatably mounted to the second tube and wherein the second port is configured to be connected to a second prong of the nasal cannula. Rotation of at least one of the first nasal adapter or the second nasal adapter changes a septal distance between the first port and the second port.

In an example, a center of an opening of the first port is offset from a center of an opening of the first cylinder. In another example, the first tube has an angled tip configured to reduce a Venturi effect. In a further example, the first nasal adapter includes a conical portion between the first port and the first cylinder.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Advantages of the disclosed techniques may become apparent upon reading the following detailed description and upon reference to the drawings in which.

DETAILED DESCRIPTION OF SPECIFIC EMBODIMENTS

Figure 1:
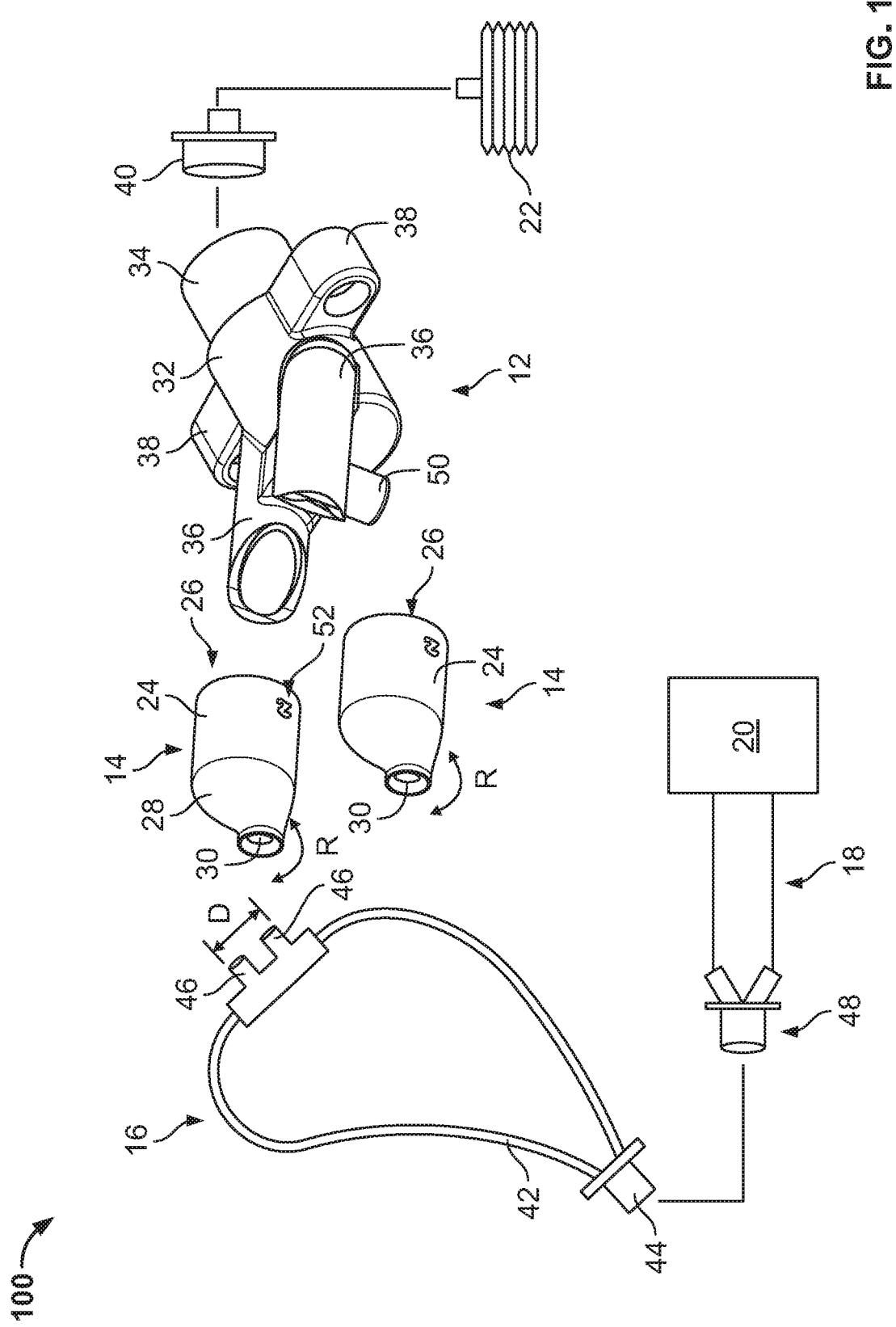
FIG. 1 is a perspective view of a neonatal airway simulator, according to embodiments of the present disclosure.

A patient airway simulation system 100 is shown in FIG. 1, according to an embodiment. The simulation system 100 connects a nasal interface to a simulated patient airway. The simulation system includes a test fixture or base 12 and two nasal adapters 14. The nasal adapters 14 connect to a nasal interface such as a nasal cannula 16. The nasal cannula 16 is connected to a breathing circuit 18 and a ventilator 20, as described more fully below. On the other side of the test fixture 12, the system connects to a lung simulator such as a bellows 22.

The system 100 simulates a patient airway, such that the ventilator 20 can be used in testing or training procedures as though a patient were connected to the ventilator. In the embodiment shown, the system 100 simulates the nasal nares of a patient, for testing or training with a nasal interface. In particular, the two nasal adapters 14 simulate the two nostrils or nares of a patient. These two adapters 14 are mounted onto the base or test fixture 12 on one end (the machine end, toward the ventilator 20), and a lung simulator such as the bellows 22 are connected on the other end of the base (the patient end, toward the patient's lungs). When connected in this way, the system 100 simulates a patient's nose, airway, and lungs. The ventilator can then be operated to deliver air through the simulated patient airway (through the nasal adapters and into the lungs), for testing, training, or demonstration purposes.

Still referring to FIG. 1, the nasal adapters 14 are each shaped as a hollow cylinder 24 with an open end 26 (the patient end). At the other end of the cylinder 24 (the machine end) is a tapered section or cone 28 with an opening or port 30. The port 30 represents the nostrils or nares of the patient. The shape of the nasal adapter 14 is designed to simulate a nostril and connect the nasal opening (port 30) to the test fixture 12.

The test fixture 12 includes a central body or bracket 32 that supports a connector 34 on one end (the patient end), and two tubes 36 on the other end (the machine end). A channel passes through the test fixture 12, enabling breathing gases to flow into the tubes 36, through the bracket 32, and out the connector 34 (for inhalation into the simulated patient), and in the reverse direction (for exhalation out of the simulated patient). Each tube 36 receives one nasal adapter 14, by sliding the opening 26 of the cylinder 24 over the free end of the tubes 36. Accordingly, the size of the inner diameter of the cylinder 24 (e.g., the diameter of the opening 26) may be approximately the same as the outer diameter of the tubes 36.

The bracket 32 has wings 38 for mounting or storing the test fixture 12, for convenience. Each of the wings 38 may include a through hole that allows for a mounting structure or fastening device to be inserted through each of the wings 38. The test fixture 12 also includes a measurement port 50 for connection to a measurement sensor, such as a pressure sensor, for measuring pressure of the breathing gases flowing through the test fixture 12. A passage 54 (see FIG. 3) connects the tubes 36 to the measurement port 50.

Other sensors (such as sensors measuring gas flow or temperature) can be attached at other ports or fittings. Additional ports on the test fixture 12 can be provided to simulate leak from the system, such as unintended air leak out of the breathing circuit or nasal interface. In another embodiment, leak in the system is simulated by choosing larger nasal adapters with larger ports 30, without separate leak ports.

In an embodiment, the nasal adapters 14 and the base or test fixture 12 are designed with smooth interior channels that deliver laminar flow of breathing gases, for more accurate gas measurements. The channels passing through the nasal adapters 14 and base or test fixture 12 have smooth interior surfaces, without ridges or protrusions that could otherwise introduce turbulence into the flow. The two tubes 36 on the base or test fixture 12 have an angled tip (at the machine end) to minimize air turbulences and Venturi effect in the flow of gas through the tubes.

As shown in FIG. 1, the bellows 22 is connected at the patient end of the system 100. The bellows 22 may be one or two test lungs or other lung simulators. In an embodiment, the expandable bellows portion is made from silicon or rubber material. The bellows 22 is connected to the connector 34 via another adapter 40, which could be a simple fitting or could include an endotracheal tube, or other airway tube. The bellows 22 inflates and deflates in response to breaths delivered by the ventilator. Suitable bellows and lung simulators are commercially available, such as the IngMar Neo-Lung (available from IngMar Medical of Pittsburgh, Pennsylvania).

At the other end of the test fixture 12, the nasal adapters 14 are connected to the nasal cannula 16. The nasal cannula 16 includes a flexible breathing tube 42, a fitting 44, and two nasal prongs 46. The nasal prongs 46 are separated by a septal distance D. Nasal cannulas 16 are made with various size nasal prongs 46 and septal distances D, to fit different patient nose sizes and anatomies. In use with the system 100, the nasal prongs 46 are inserted into the ports 30 of the nasal adapters 14. The fitting 44 is attached to the breathing circuit 18, such as through a wye fitting 48. The breathing circuit 18 has two limbs, inspiratory and expiratory, that connect to the ventilator 20.

The nasal adapters 14 can be rotated (as shown by arrows R in FIG. 1) to bring the two ports 30 closer together or farther apart. In an embodiment, the nasal adapters 14 can be freely rotated on the tubes 36 to adjust the distance between the two ports 30. By rotating the nasal adapters 14 and moving the ports 30 closer or farther from each other, the simulator system 100 can be adjusted to simulate different septal distances of a simulated patient. The ports 30 can be brought closer together to simulate a patient with a narrower separation between nostrils, or the ports 30 can be rotated away from each other to simulate a patient with larger separation. The simulated patient can then be tested with nasal cannulas 16 with various septal distances D.

Figure 2:
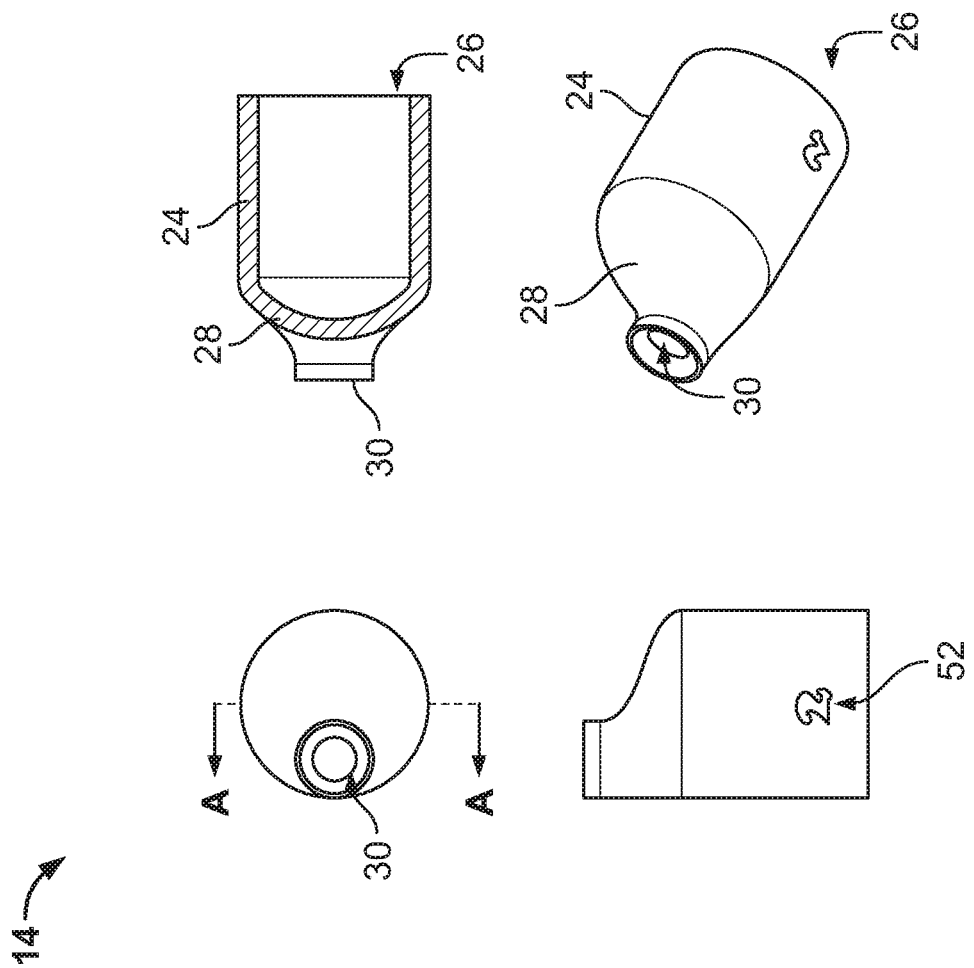
FIG. 2 is a collection of views of a nasal adapter, according to embodiments of the present disclosure.

Additional views of the nasal adapter 14 are shown in FIG. 2. As can be seen from the figures, a center of the opening of the port 30 is offset from a center of the opening 26 of the cylinder 24. The offset allows for a change in septal distance between the ports 30 of the nasal adapters 14 when the nasal adapters 14 are rotated around the tubes 36. In addition, size the internal diameter of the port 30 is smaller than the size of the inner diameter of the cylinder 24.

Figure 3:
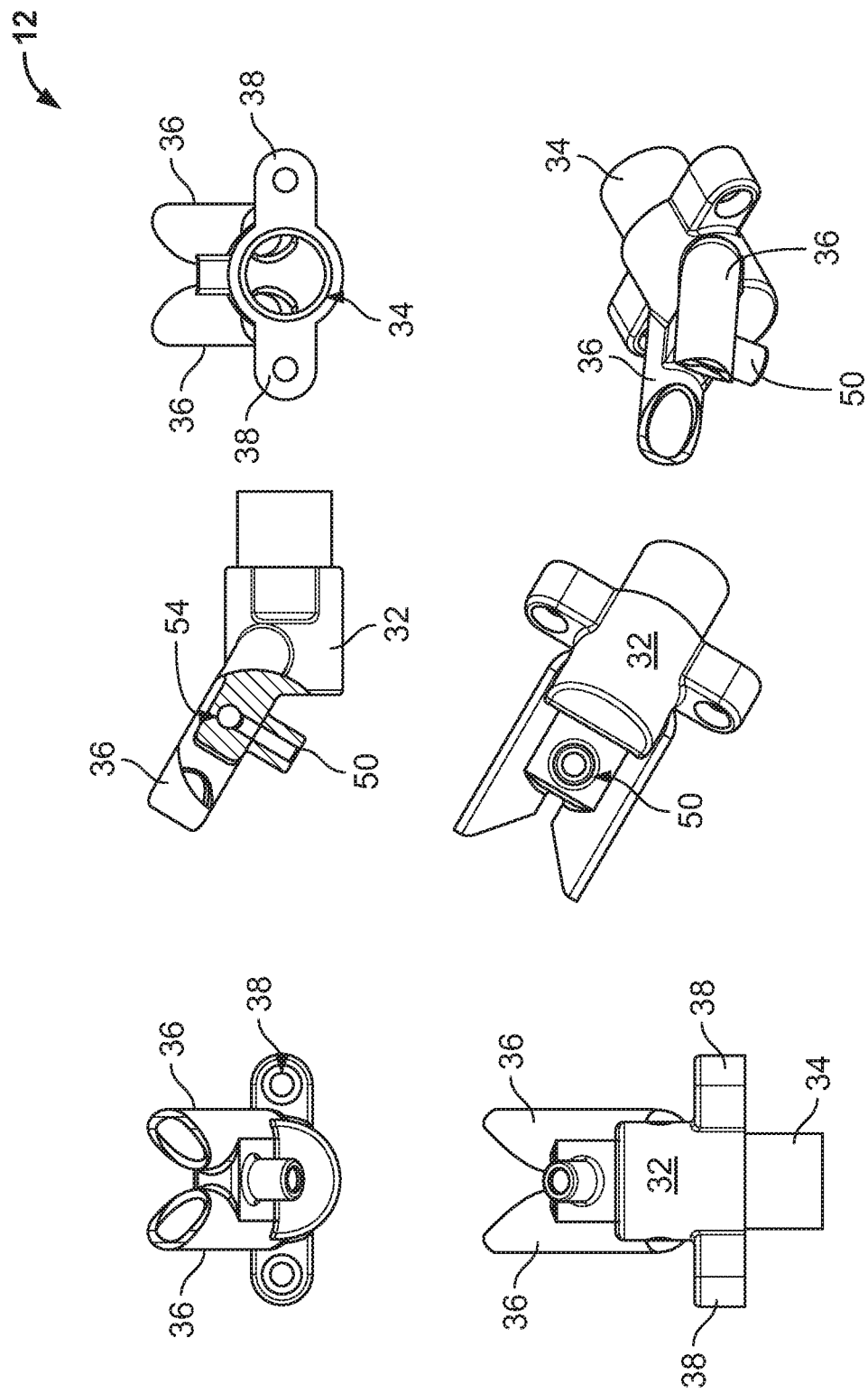
FIG. 3 is a collection of views of a test fixture, according to embodiments of the present disclosure.

Additional views of the test fixture 12 are shown in FIG. 3. The axis of each of the two tubes 36 may be parallel to one another. The axis of each of the tubes may not be parallel to an axis of the bracket or body 32. For instance, the angle between the axis of the two tubes 36 and the through hole of the body 32 may be non-zero. The axis of the connector 36 may be parallel with the axis of the two tubes 36.

In an embodiment, the test fixture 12 is made from a plastic or metal material, such as by 3D printing or machining. The nasal adapters 14 may be made from the same material. In an embodiment, the test fixture 12 and nasal adapters 14 are made from a rigid material that maintains its own shape under pressure. In an embodiment, the test fixture 12 is made from a rigid material and the nasal adapters 14 are made from a relatively more flexible material to simulate the flex of a patient's nose.

Figure 4:
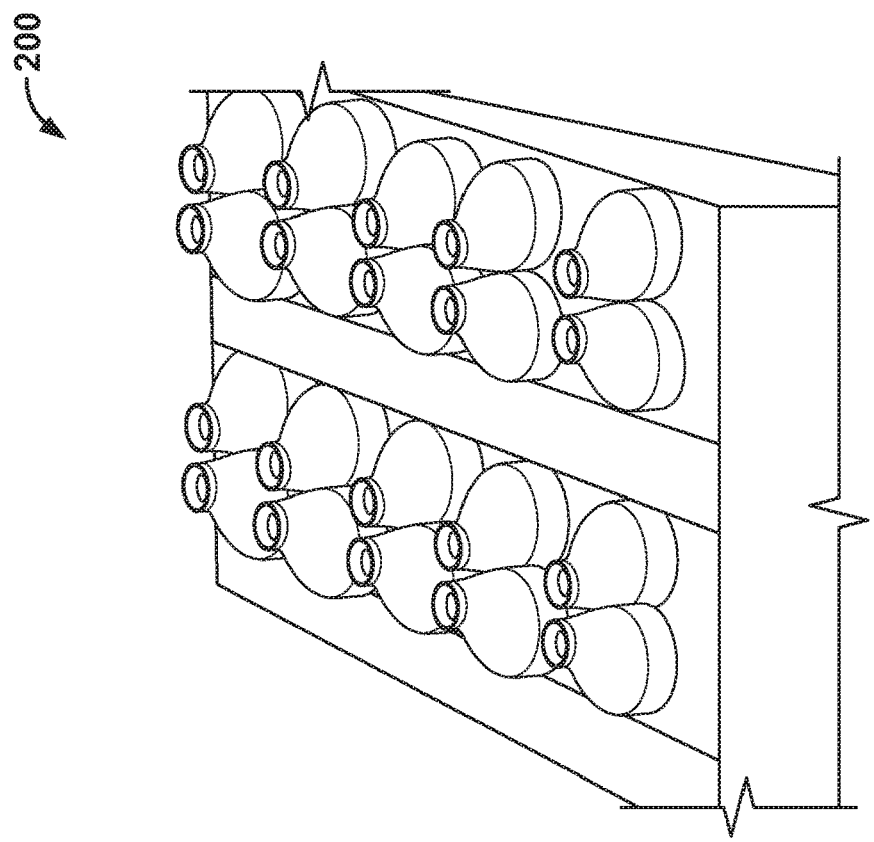
FIG. 4 is a perspective view of a line of nasal adapters, according to embodiments of the present disclosure.

In addition to varying the septal distance in the airway simulator, in an embodiment, nasal adapters 14 are provided in a range of different sizes to simulate nasal passages of different sizes. A nasal adapter system 200 is shown in FIG. 4. In this embodiment, the system 200 includes a line of ten pairs of nasal adapters of increasing sizes. The pair number 1 is the smallest, and the pairs increase in size to number 10. In an embodiment, the nasal adapters 14 in the system 200 all have the same size cylinder 24 (referring to FIG. 1), which is sized to fit snugly around the tubes 36 of the test fixture 12. The nasal adapters 14 change in size in the region of the cone 28 and port 30, which increase from size 1 to size 10. In an embodiment, each nasal adapter 14 is marked with an indicia 52 (see FIGS. 1 and 2), such as a number, letter, or symbol, that indicates its size. In an embodiment, the internal diameter of the port 30 of the nasal adapters ranges from 3 mm to 6 mm. For example, the port 30 of the size 1 nasal adapter has an inner diameter of 3 mm (or near 3 mm), and the port 30 of the size 10 adapter has an inner diameter of about 6 mm (or near 6 mm). The other nasal adapters (sizes 2-9) have inner diameters between 3 and 6 mm, respectively. In other embodiments, other size ranges are used.

By providing an adjustable distance between the ports 30 (via the rotation of the cylinders 24), and pairs of nasal adapters of different sizes (in system 200), the simulator system is able to simulate a wide variety of patient sizes and anatomies.

In an embodiment, the airway simulator simulates neonatal and/or pediatric airways and lungs. The lung simulator or bellows 22 is sized for neonatal lung volume, and the nasal adapters 14 are sized to mimic neonatal nostrils. Different bellows 22 or lung simulators can be attached (on the patient end of the system) to represent different lung sizes. In another embodiment, the airway simulator includes larger sizing, to simulate pediatric or adult patient anatomies.

Figure 5:
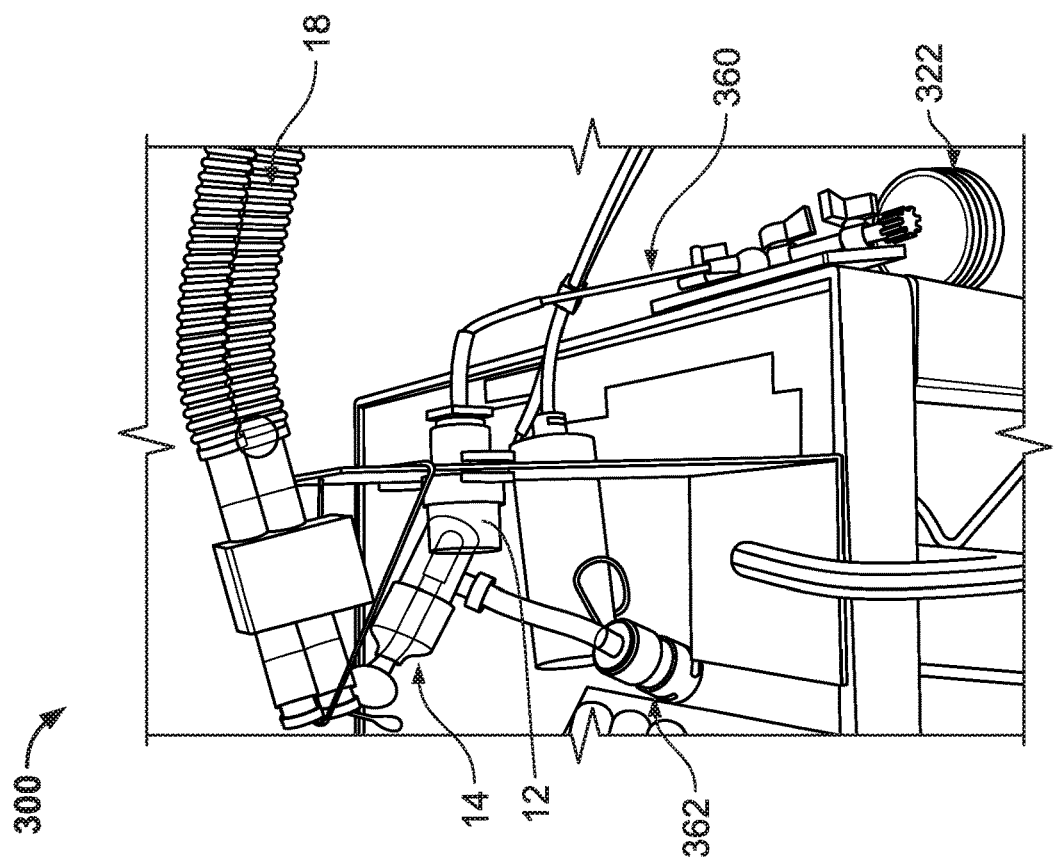
FIG. 5 is a side view of a neonatal airway simulator in use, according to embodiments of the present disclosure.

A side view of a simulator system 300 in use is shown in FIG. 5. As shown, the system 300 is connected to a single bellows 322, an endotracheal tube 360 (optional), and a pressure sensor 362. The bellows 322 is accessible during testing, and the operator can pull on the bellows to simulate an effort by the patient to inhale or push on the bellows to simulate an effort by the patient to exhale. The test fixture and nasal adapters simulate a patient's nose and nasal/oral passages, the endotracheal tube 360 simulates the patient's upper airways, and the attached bellows simulate the patient's lungs. The system 300 can be used for testing a non-invasive patient interface (such as a nasal cannula), a patient circuit, or a non-invasive ventilation mode or therapy on a ventilator. In an embodiment, the test fixture and nasal adapters are shaped to receive a nasal or face mask instead of or in addition to the prongs of a nasal cannula.

While the disclosure may be susceptible to various modifications and alternative forms, specific embodiments have been shown by way of example in the drawings and have been described in detail herein. However, it should be understood that the embodiments provided herein are not intended to be limited to the particular forms disclosed. Rather, the various embodiments may cover all modifications, equivalents, and alternatives falling within the spirit and scope of the disclosure as defined by the following appended claims.

Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

What is claimed is:

1. An airway simulator for use with a mechanical ventilator, comprising:
   a fixture body comprising a first tube and a second tube at a first end of the fixture body and a connector at a second end of the body; and
   a first nasal adapter and a second nasal adapter couplable to a nasal interface, each nasal adapter comprising an open cylinder and a port that simulates a nostril,
   wherein the first nasal adapter is rotatably mounted on the first tube, and the second nasal adapter is rotatably mounted on the second tube, wherein rotation of the nasal adapters about the first and second tubes changes a septal distance between the ports of the first and second nasal adapters.

2. The airway simulator of claim 1, further comprising additional pairs of nasal adapters of different sizes.

3. The airway simulator of claim 1, wherein the fixture body further includes a measurement port.

4. The airway simulator of claim 1, wherein the fixture body further includes a leak port configured to simulate a leak condition.

5. The airway simulator of claim 1, wherein:
   the cylinder of the first nasal adapter has an internal cylinder diameter size;
   the cylinder of the second nasal adapter has the internal cylinder diameter size;
   the port of the first nasal adapter has an internal port diameter size, wherein the internal port diameter size is smaller than the internal cylinder diameter size; and
   the port of the second nasal adapter has the internal port diameter size.

6. The airway simulator of claim 5, wherein the internal cylinder diameter size is approximately a size of an outer diameter of the first tube.

7. The airway simulator of claim 5, wherein the first nasal adapter includes a conical segment between the port and cylinder.

8. The airway simulator of claim 1, wherein the fixture body is made from a first material and the first nasal adapter is made from a second material, wherein the second material is more flexible than the first material.

9. An airway simulator kit for use with a mechanical ventilator, the kit comprising:
    a fixture body comprising:
        at a first end of the body, a first tube and a second tube; and
        at a second end of the body, a connector configured to be connected to a lung simulator; and
    a set of nasal adapters configured to be coupled to a nasal cannula and at least one of the first tube or the second tube, the set of nasal adapters comprising:
        a first pair of nasal adapters, wherein each nasal adapter in the first pair of nasal adapters includes a first cylinder having an internal diameter size and a first port having a first internal port diameter size, wherein the first port simulates a first nostril; and
        a second pair of nasal adapters, wherein each nasal adapter in the first pair of nasal adapters includes a second cylinder having the internal diameter size and a second port having a second internal port diameter size, wherein the second internal port diameter size is different from the first internal port diameter size and wherein the second port simulates a second nostril.

10. The airway simulator kit of claim 9, wherein each nasal adapter in the first pair of nasal adapters includes a first indicia indicative of the first internal port diameter size, and wherein each nasal adapter in the second pair of nasal adapters includes a second indicia indicative of the second internal port diameter size.

11. The airway simulator kit of claim 9, wherein each nasal adapter in the first pair of nasal adapters is configured to be rotatably mounted to at least one of the first tube or the second tube.

12. The airway simulator kit of claim 11, wherein each nasal adapter in the first pair of nasal adapters is configured such that rotation of at least one of the nasal adapters in the first pair of nasal adapters changes a septal distance between the ports of the nasal adapters in the first pair of nasal adapters.

13. The airway simulator kit of claim 9, wherein each nasal adapter in the first pair of nasal adapters includes a conical segment between the first cylinder and the first port.

14. The airway simulator kit of claim 13, wherein the first internal port diameter is smaller than the internal diameter size of the first cylinder of the nasal adapters in the first pair of nasal adapters.

15. The airway simulator kit of claim 9, wherein the first port diameter size is in a range of 3-6 mm.

16. The airway simulator kit of claim 9, wherein the fixture body further includes at least one of a measurement port or a leak port.

17. An airway simulator comprising:
    a fixture body comprising:
        at a first end of the body, a first tube and a second tube; and
        at a second end of the body, a connector configured to be connected to a lung simulator; and
    a first nasal adapter including a first cylinder and a first port, wherein the first cylinder is configured to be rotatably mounted on the first tube and wherein the first port simulates a first nostril of a nose and is configured to be connected to a first prong of a nasal cannula; and
    a second nasal adapter including a second cylinder and a second port, wherein the second cylinder is configured to be rotatably mounted to the second tube and wherein the second port simulates a second nostril of the nose and is configured to be connected to a second prong of the nasal cannula;
    wherein rotation of at least one of the first nasal adapter or the second nasal adapter changes a septal distance between the first port and the second port.

18. The airway simulator of claim 17, wherein a center of an opening of the first port is offset from a center of an opening of the first cylinder.

19. The airway simulator of claim 17, wherein the first tube has an angled tip configured to reduce a Venturi effect.

20. The airway simulator of claim 17, wherein the first nasal adapter includes a conical portion between the first port and the first cylinder.

* * * * *